(12) United States Patent
Bodie et al.

(10) Patent No.: US 6,456,921 B1
(45) Date of Patent: Sep. 24, 2002

(54) METHOD AND SYSTEM OF BRAKE SYSTEM CONTROL

(75) Inventors: Mark O. Bodie; Jon T. Zumberge, both of Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/811,954

(22) Filed: Mar. 19, 2001

(51) Int. Cl.[7] .................................................. G06F 19/00
(52) U.S. Cl. .......................................... 701/70; 701/78
(58) Field of Search ............................... 701/70, 78, 83; 303/1, 11; 188/382

(56) References Cited

U.S. PATENT DOCUMENTS 5,558,409 A     9/1996   Walenty et al. ............... 303/10
6,075,332 A  *  6/2000   McCann ...................... 318/432

* cited by examiner

Primary Examiner—Yonel Beaulieu
(74) Attorney, Agent, or Firm—Scott A. McBain

(57) ABSTRACT

A method is provided for use in an electronic processor-controlled vehicular braking system. When integrated into such a braking system, the need for downstream caliper pressure sensors, and any algorithms associated therewith, is eliminated. The method consists of generating and using estimated caliper pressure for comparison to command pressure, instead of actual caliper pressure. The method elicits a far quicker yet accurate response to the estimated caliper pressure in line with command pressure.

24 Claims, 3 Drawing Sheets

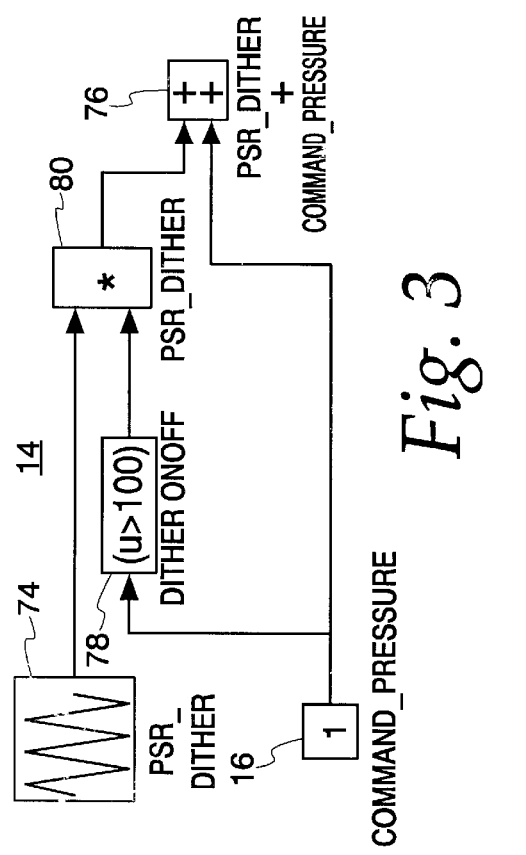
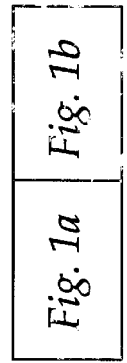
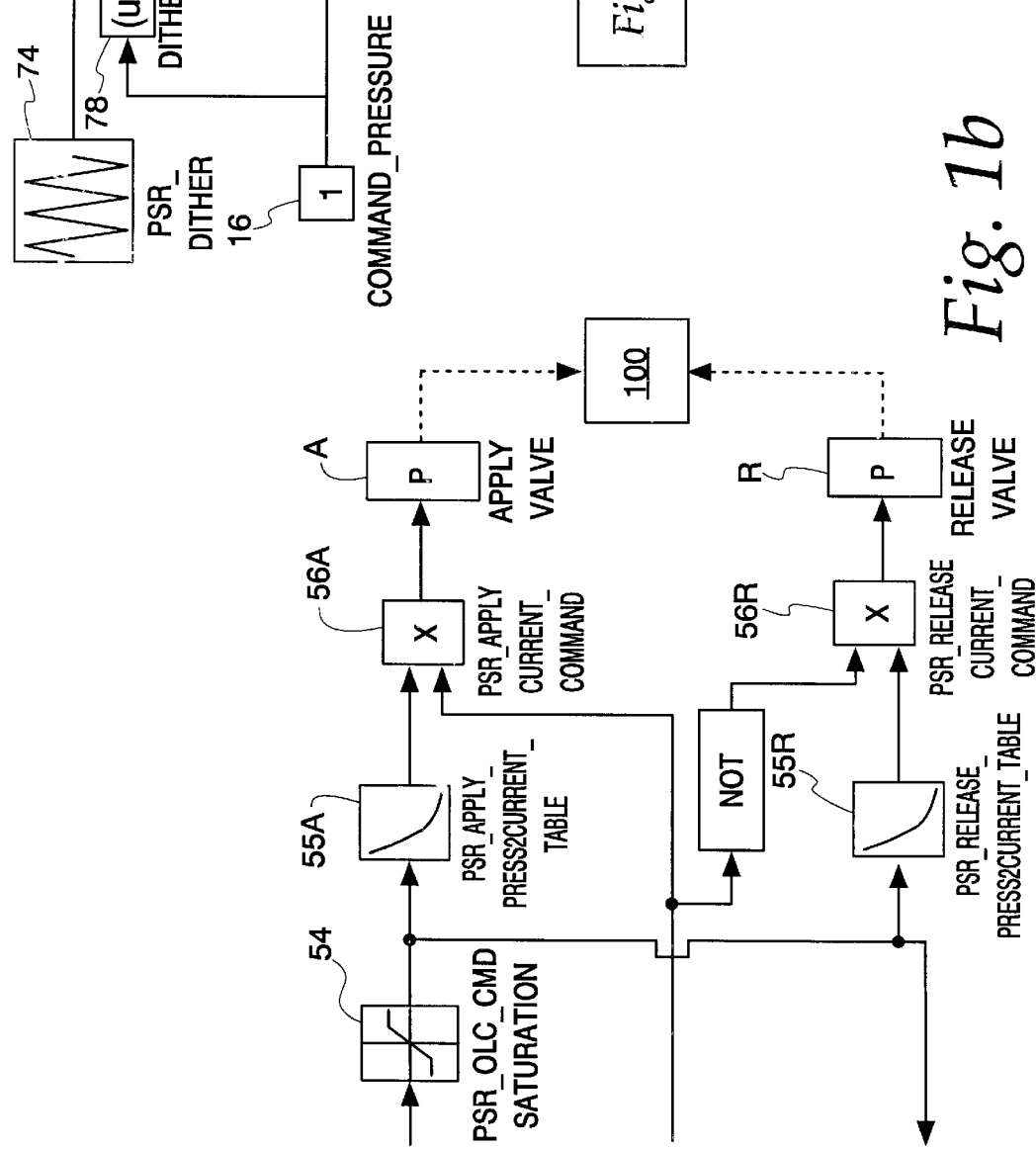
Fig. 3
Fig. 1
Fig. 1a | Fig. 1b
Fig. 1b

METHOD AND SYSTEM OF BRAKE SYSTEM CONTROL

TECHNICAL FIELD

The present invention provides a method and system of controlling an electronic brake system for a vehicle. The method includes estimation of the caliper pressure and comparing the estimated pressure to the commanded pressure. The method eliminates the need for downstream caliper pressure sensors and corresponding control methods of the brake system.

BACKGROUND OF THE INVENTION

Heretofore, downstream caliper pressure sensors have been required in electronically controlled vehicle braking systems, such as the brake-by-wire type system defined in U.S. Pat. No. 5,558,409 entitled "Electrohydraulic Braking System", for use in comparing sensed actual caliper pressure feedback from a downstream caliper pressure sensor to commanded or required brake pressure, with any error between the two being accommodated for by varying the position of solenoid operated apply and release valves of the caliper actuation system. These systems typically requires a set of pressure sensors, each one of which is associated with a single wheel brake assembly.

As will be described in greater detail hereinbelow, the method of the present invention eliminates the need for the downstream caliper pressure sensors and associated control thereof, and also shortens error accommodation response time, allowing larger valve commands in transitions, which results in faster response time for the system, thus enhancing braking capability of the system.

SUMMARY OF THE INVENTION

According to the invention there is provided a method and system for use in an electronic processor controlled vehicular braking system. The method allows elimination of caliper pressure sensors and any controls systems and associated algorithms from the braking system, while improving braking capability through decreasing response time of the system.

In the brake-by-wire system, like that used with the present invention, it will be understood that a pump applies high-pressure fluid to an accumulator. The accumulator stores a large volume of high-pressure fluid. The accumulator is used so that high-pressure fluid is always available on demand. Without the accumulator, the system would have to wait until the pump generates pressure before the pressure can be used to activate the caliper. A reservoir is used to hold fluid, which can be sent to the low-pressure side of the pump and also collects fluid from a release valve. Brake calipers convert the fluid pressure to force, which is applied to brake rotors. As fluid enters the calipers the caliper pistons are displaced. The amount of fluid to achieve desired pressure is a function of the caliper compliance.

With respect to operation of a brake-by-wire system, it should be understood that three important forces are acting on each valve, also known as a proportional poppet valve. The three forces include a force applied by an electrical coil, a force applied by fluid pressure and a biasing force applied by a spring in the valve. When a current is applied to the coil, the poppet is moved in such a way to permit fluid to flow between the accumulator to the caliper. As the fluid pressure increases in the caliper, the pressure difference across the valve reduces and therefore the fluid pressure force reduces. Thus, when the coil force and the spring force remain unchanged the valve begins to close. The proportional poppet valve will close completely when the differential pressure across the valve is reduced and the spring force overcomes the coil and any remaining fluid pressure force. Therefore, a given coil current results in a given caliper pressure.

Because the object of the present invention is to eliminate the need for caliper pressure sensors, fluid pressure at the caliper is estimated. To estimate the pressure at the caliper, fluid flow through the valve is determined. For a given coil and pressure force the valve will move to a particular position. If the pressure force is reduced or increased the valve will move accordingly and the gap in the valve or opening therethrough will change. If the coil forces increase or decrease the gap will also change accordingly. The gap in the valve determines the fluid flow through the valve. Therefore, for a given current to the coil and a given differential pressure across the valve there will be a given flow through the valve, which can be determined experimentally on a flow bench.

With knowledge of the caliper compliance (determined experimentally) and the fluid flow through the valve, pressure inside the caliper can be estimated. Pressure inside the caliper is a function of the volume of the fluid inside the caliper. The volume of incoming fluid can be determined by integrating the flow through the apply valve. The volume of the fluid leaving the caliper is determined by integrating the flow through the release valve. The volume of fluid in the caliper is known and therefore the caliper pressure is known. With this information, the pressure at the caliper can be estimated, and control of the valves can occur without a pressure sensor located at each caliper.

One aspect of the present invention provides a method of controlling a brake system including eliciting a command pressure value from a brake processor or control module of the system; initializing and generating an estimation of caliper pressure through use of empirically determined system specific data in control module memory, comparing the command pressure value to the estimated pressure value and, if a correlation error exists, calculating opening and closing parameters for apply and release valves for caliper actuation medium to eliminate the error; and cycling back through at least the above steps in closed loop fashion until the comparison of command and estimated pressures provides a substantially no error reading, indicating a steady state between the estimated and required or command caliper pressure.

Through use of a second method of the set, estimated caliper pressure for each cycle is determined, and through use of a third method of the set, the apply and release valves are constantly manipulated about a steady state position for increasing reactivity thereof, and eliminating any steady state error that might exist, over time.

An aspect of the present invention includes a brake control method for use in an electronically controlled brake-by-wire type vehicular braking system including determining a command caliper pressure, determining an estimated caliper pressure, comparing the command to the estimated caliper pressure to produce an error value, multiplying the error value by a predetermined gain to produce a valve command and controlling apply and release valves responsive to the valve command.

In other aspects of the present invention the determination of the command caliper pressure includes determining a command pressure value from a brake control module of the system, determining a wheel speed, calculating a wheel speed gain value from the sensed wheel speed and proportioning the wheel speed gain value to the command pressure value to provide a proportioned wheel speed gain value, the proportioned wheel speed gain value providing the command caliper pressure.

In other aspects of the present invention the determination of the estimated caliper pressure includes sensing a supply pressure reading from a high pressure source for the caliper actuating medium, eliciting a past cycle estimated pressure value, comparing the supply pressure with the estimated past cycle pressure value to obtain a differential pressure reading across the caliper and comparing the differential pressure reading, the past cycle pressure value reading, a past value direction reading and a past valve operation command to corresponding lookup tables for apply pressure vs. valve position and release pressure vs. valve position. The lookup table results can be saturated to assure they are within limits of the system. An estimation of caliper pressure can be initiated from the saturated input parameters when a brake pedal of the system is applied and the estimation can be saturated within system limits. In other aspects of the method of the present invention the command pressure can be compared to the saturated estimated pressure and, if an error exists, appropriate opening and closing of the apply and release valves are controlled to eliminate the error and the steps are cycled through in closed loop fashion until the comparison of command and estimated pressures provides a substantially negligible error reading, indicating a steady state.

The method of the present invention can include name dithering process in the change of command caliper pressure function. The dithering process can be apply to the command caliper pressure when the pressure is at a steady state above a predefined lower limit, such that fluctuations of the dither are applied to the command caliper pressure at steady state to keep apply and release valves of the system constantly operational rather than fixed in position, while still maintaining the steady state.

The rates of flow, through both apply and release valves, can be determined simultaneously. The rates of flow can be summed through both apply and release valves. The summed flow rates can be converted to a volume reading. The predetermined corresponding pressure value can be compared to the command pressure value to determine if a difference exists. From an existing difference it is determined which of the apply and release valves must be actuated to eliminate the difference. At least one of the apply and release valves are controlled to eliminate the error difference and produce a steady state.

At least one of the apply and release valves can be oscillated by applying a dither feature to the command pressure value, causing the value to oscillate between upper and lower values between which the steady state is centered.

Estimation of caliper pressure can further include comparing line in solenoid valve flow to a lookup table of apply pressure values in a memory of a control module of the system, comparing line out solenoid valve flow to a lookup table of release pressure values in a memory of a and control module of the system and summing the pressure values together to obtain estimated caliper pressure. A saturation point restriction based on system limits can be applied to the estimated caliper pressure. All variables can be placed under a saturation point restriction based on system limitations. All variable values can be reset to 0 upon brake pedal release. Command pressure and accumulator pressure can actualize upon logic initialization. Release of the brake pedal can be recognized by the logic; ending the process. The dither feature can be turned off below a predefined command pressure value.

Another aspect of the present invention in an electronically controlled vehicular braking system incorporating a caliper actuation assembly including at least one valve, provides a method including the steps of generating pressure application command to the caliper actuation assembly by controlling positioning of the at least one valve thereof, estimating the actual pressure applied from a lookup table of predefined levels of applied pressure corresponding to valve position and generating periodic modulated valve control signals until a near zero difference is determined to exist between the command and estimated applied pressures from the predetermined lookup table data correlating estimated applied pressure and valve position.

Another aspect of the present invention provides an electronically controlled brake system including a controller for controlling pressure applied by a brake caliper through adjustment of at least one valve associated with the caliper, required valve adjustment being determined from a lookup table of estimated pressure applied correlated to valve position, with valve position being adjusted continuously until the estimated pressure applied is substantially identical to pressure required to produce a brake apply of required level as it pertains to brake command pressure.

Another aspect of the present invention provides a brake control system including means for determining a command caliper pressure, means for determining an estimated caliper pressure, means for comparing the command to the estimated caliper pressure to produce an error value means for multiplying the error value by a predetermined gain to produce a valve command and means for controlling apply and release valves responsive to the valve command.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 is an enhanced detail block diagram of the dithering method of the set of FIG. 1.

DESCRIPTION OF THE PREFERRED EMBODIMENTS

Figure 1A:
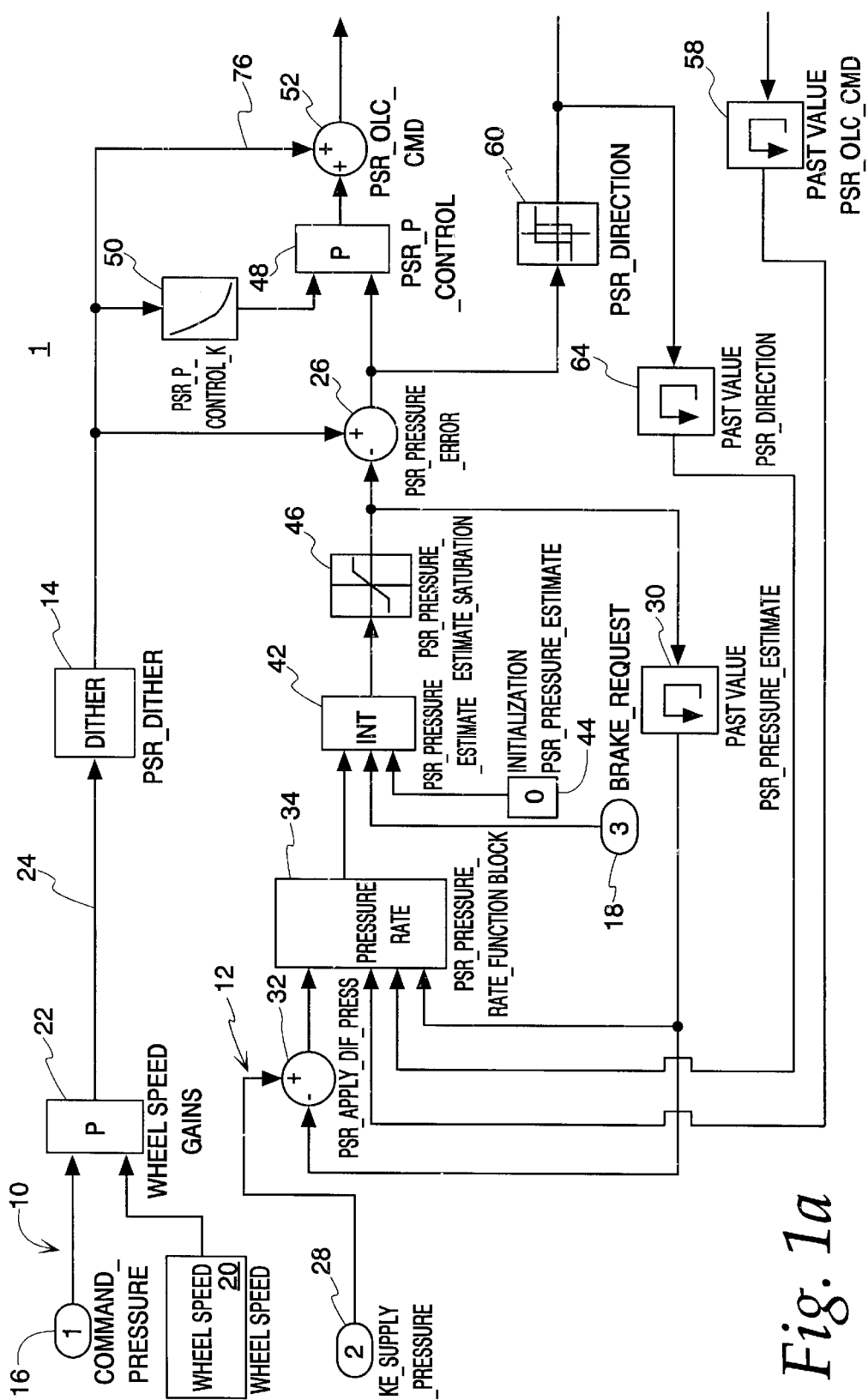
FIG. 1 is a schematic block diagram generically setting forth the steps of the method of the present invention.

Referring now to the drawings in greater detail, there is generically illustrated in FIG. I an embodiment of a method of the present invention for use in an electronic processor controlled braking system of the type described in U.S. Pat. No. 5,558,409, the teachings of which are incorporated herein by reference.

The present invention includes a brake control method 1, which includes three distinct yet interrelated logical operations. A first process or operation 10 includes a main or command control method 10. A second operation 12 (FIG. 2) includes a caliper pressure-estimating method 12. And, a third operation 14 (FIGS. 1 and 3) includes a dither or modulating method 14.

The brake control method 1 of the present invention is provided as an improvement over the above-mentioned brake system that incorporates use of downstream caliper pressure sensors in braking control, with the present method 1 eliminating the need for such caliper sensors, and any process steps associated therewith. It will be understood that use of the herein described process set 1 is only applicable during braking application, with any input variables resetting to zero upon release of the brake pedal.

Upon initialization, although it is preferred that variables be initiated from a 0 value, certain parameters can begin at true reading levels for functionality of the system. In this respect, a command pressure value, and actuating fluid supply pressure values will be available at initialization. Also, a brake request will be recognized for initialization of the operation 1, as will be understood by those skilled in the art upon perusal of the teachings herein.

Beginning with FIG. 1, the first cyclic operation 10 of the set 1 can begin with the reception of a sensed brake command pressure value 16, as determined through application of a corresponding process described in the teachings of U.S. Pat. No. 5,558,409 via brake pedal activation sensed at 18 by the driver of the vehicle incorporating the processor controlled electronic brake system. Concurrently, a wheel speed determining process 20 such as that also defined in U.S. Pat. No. 5,558,409, can be performed by the brake control module or processor of the system disclosed therein. Wheel speed 20 can be used to confirm that caliper pressure is correct for the required or commanded level of braking by checking for the required wheel deceleration, with the wheel speed data also defining a wheel speed gain 22 to be used herein. The wheel speed value 20 and the command pressure value 16, can be fed to a proportional wheel speed gain calculator 22 wherein the gain 22 and command pressure 16 are multiplied together and then multiplied by an empirically predetermined system specific, proportioning factor, with the proportioned output value 24 providing required or command caliper pressure, used in caliper pressure error determination 26, as will be described below.

In one embodiment, a dither feature 14 used in eliminating any steady state errors that may exist, over time, may be applied to the command pressure value 24, as will be described in detail in connection with the description of FIG. 3.

Next, pressure within a high-pressure accumulator or source for a medium (typically a hydraulic fluid) used for caliper actuation can be sensed at 28. It will be understood here that the medium from the high-pressure accumulator can be fed to the caliper through a proportional poppet apply valve (shown at A) in a medium-in line as is known in the art. Pressure in the medium-in line is incrementally adjustable based on electrical current applied to the valve, within inherent limits, to provide required caliper 100 pressure for vehicle braking. Likewise, it will be understood that the medium must be drainable, or the pressure generated thereby to be released, to allow for release of the calipers 100, draining also being controlled through use of a similar incrementally adjustable proportional poppet release valve (shown at R), with the medium draining, for example, to a reservoir at atmospheric pressure.

The accumulator pressure value 28 together with an estimated caliper pressure value 30 from a previous loop of this cyclic logic can be used to calculate the required differential pressure across the apply and release valves A, R, to develop conformity of estimated applied caliper pressure to the command pressure.

Such calculation of the differential pressure at 34 can be accomplished in part through use of lookup tables. It will be understood that the lookup tables referred to herein can be separate tables or a combined table including, for example, both apply and release flow rate data and caliper compliance data. It will also be understood that all the lookup tables defined herein incorporate data that has been empirically determined, with values therein necessarily taking into account physical limits of the system. This can be best understood when looking at FIGS. 1 and 2 concurrently.

A first lookup table can include empirically determined proportional differential pressure values across the apply valve at 33, with the pressure values being correlated to apply valve position. A second lookup table can include empirically determined proportional differential pressure values across the release valve at 36, with the pressure values again being correlated to release valve position.

It will be understood by those skilled in the art that the degree of orifice opening of the valve is changeable relative to the amount of current provided to the coil actuator. Thus, the lookup table values can be deduced with a great degree of accuracy. It will also be understood that all systems have built in limitations. For example, there is a maximum level of flow through a valve orifice that cannot be overcome, as there is a maximum amount of current available in a particular closed circuit. Therefore such limitations can be accommodated by setting upper limits, which can be defined as points of saturation.

In the embodiment illustrated, the points of saturation are not incorporated into the lookup tables but rather can be applied separately, at 38 for the apply value and at 40 for the release value. Incorporating system limitations into the lookup table definitions can eliminate this separate saturation application. However, if desired to "fine tune" the system at some future date, saturated lookup tables can be completely recreated, which is a more demanding task than setting out saturation determinants separately and simply modifying single values being processed.

The saturation points are incorporated herein because the process set 1 cyclically loops and considers prior value data and any generated values, which are not feasible for consideration within system limits, should be avoided. For example, if limits of current available for the system were hypothetically 30 amps, taking into account a requirement of 100 amps would be impossible to accommodate, and would skew future cyclic determinations as well. Thus, saturation points for the system can be predefined to prevent such skewing.

Next, fluid flow through the caliper 100 can be determined from the estimated apply and release values. The apply value, which increases caliper pressure value, can be considered a positive value and the release value, which decreases caliper pressure value, can be considered a negative value. The sum of the estimated apply and release values provides a flow value for the caliper. However, flow is converted to volume because caliper stiffness is determinable from volume change, from which the caliper pressure then may also be deduced.

Flow is typically defined as volume over time. To obtain a desired volume reading, the flow value can be integrated at 42, through application of a known formula of 1/s, with s being a system specific parameter, as known. This is known as a "Laplace Transform". It will be understood that integration calculations should only be made during brake application, with a zero constant being reset at 44 for all variables upon brake pedal release sensed at 18, to minimize and preferably eliminate potential integration errors. Reiterating, pressure error 26 can be computed as the difference between the estimated and command pressure, with the estimated pressure value also being saturated at 46.

Gain scheduling can be again applied at 48, a further lookup table providing gain values, with such values being "fine tunable" in any desired manner for system specificity. Gain can be based on error; with the error term being proportioned at 52 by multiplication thereof by a system specific gain, to provide a feedback valve command function at 56A, 56R. Presentation of gain in lookup table form provides added flexibility to the system by providing error based gain values rather than by application of a constant with the error factor here being multiplied by a gain that is proportional to, or a function of, the gain itself.

The proportional value can be saturated at 54 and fed out as a valve command at 56A, 56R eliciting valve opening or closure, to a particular degree, of a particular valve (A or R, respectively). This logic stream can be repeated cyclically, generating estimated caliper pressure values based on instantaneous valve position as it relates to the valve command 56A, 56R.

The values from a past pressure loop 58 and the current loop can be summed to provide the feedback term which is saturated to system limits and fed back to the apply and release tables to recalculate flow through the caliper 100 relative to the valve command. It will be understood that the apply and release lookup table values 34 and 36 are continuously one loop behind the remaining logic data with respect to feedback thereto.

Next, the direction for valve activation can be determined. Here, rather than considering the level of opening or closing a valve must be set, a determination can be made as to which valve is to be activated; the apply or release valve. This determination at 60 is based on error and the sign thereof. Here, it will be understood that a 0 pressure error indicates a steady state. Thus, if pressure error is greater than 0, system logic must necessarily activate the apply valve, increasing pressure and if the pressure error. Conversely, if the pressure error is less than 0, the pressure needs to decrease, thereby also decreasing the pressure error. Bringing a steady state into existence here would then require activation of the release valve instead. Viewed in another way, relative to the sign of the error, positive actuates apply while negative actuates release.

From this point, a desired valve A, R can be actuated in a desired manner to eliminate pressure error, thus to produce the desired actual pressure in the caliper, via issuance of the valve command 56A or 56R to the appropriate valve A or R of the system. The valve command 56A or 56R will necessarily be within system limits, with a predetermined saturation table for this variable being located in controller memory and the saturation being applied at 54 prior to valve actuation.

It should be understood that the current through coil of valve A or R controlling valve actuation thereof can be determined by lookup table 55A or 55R for the apply and release valves respectively. In each table 55A, 55R, the entering pressure value is converted to a current to provide an apply or release command according to direction.

Feedback data can be fed to and incorporated into the data in corresponding lookup tables for a plurality of variables for use in the next cyclic computations. As shown, these feedback variables comprise past estimated caliper pressure 30, past error direction 64, and past valve actuated 16. Here, the need for setting of the various saturation limits becomes clear.

Figure 2:
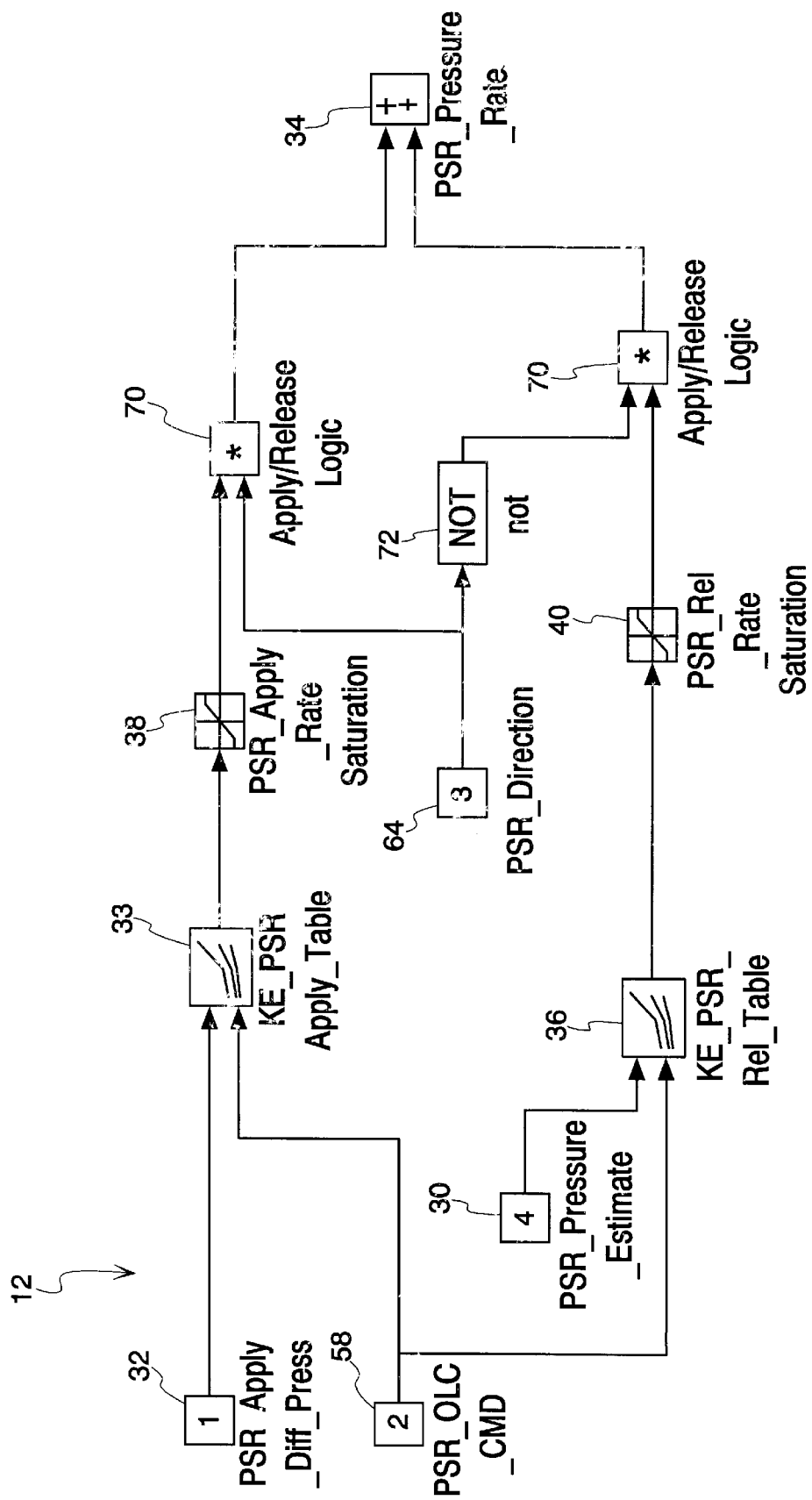
FIG. 2 is an enhanced detail block diagram of the caliper pressure-estimating method of the set of FIG. 1.

The second feature 12, (See FIG. 2), of the process set dealing with steps taken in determining the estimated caliper pressure for use in the method depicted in FIG. 1 is more fully detailed in FIG. 2. First the known apply differential value as calculated 32 in relation to FIG. 1 and the known command pressure 58 from a previous loop of the cyclic logic can be compared to a predetermined value set of apply rates in an apply rate lookup table in processor memory at 33. The correlated apply rate value can be then saturated to system limits at 38. Based on the flow rate value, direction for flow, i.e., in terms of apply or release, can be determined as will be described, with logic being set to 1 for apply and to 0 for release, with the upper stream of the illustration being applicable to the apply calculation for flow through the apply value.

The lower logic stream of the illustration is, conversely, applicable to release rate calculation for determining flow through the release valve. Here a release rate lookup table 36, which has empirically predetermined values therein, can be consulted by the logic, this table including calibration variables, to provide a release rate value. This release rate value can be again saturated at 40 to system limits. Thus, the upper logic stream provides apply pressure, and the lower logic stream provides release pressure, with a sum of the two providing differential pressure across the release valve, which correlates to caliper pressure.

The process can then move onto direction logic to determine which of the apply and release valves are to be activated, logic being set to recognize that if it is not the release valve to be activated, the logic is 0, but if it is the release valve to be activated, the logic is 1. The logic values can be then summed to provide a pressure rate value input to 70.

The apply/release logic 70 can employ a NOT logical operation 72 between the apply and release logic streams, which acts to convert the logic 1 to 0 and the logic 0 to a 1, as is known, by multiplying by 1, to reverse the logic.

It will be remembered that the logic is set to recognize apply as 1 and release as 0. Thus, if the direction provides a 1 for apply, this is multiplied by 1, which becomes 0 after application of the NOT logic which, when multiplied by the release saturated flow, provides a 0. Conversely, the other option of direction 0 for release, becomes 1 after application of the NOT logic, after multiplying by 1. The apply and release logic values are summed to provide a flow or pressure rate value, to provide the estimated caliper pressure for use in the process of FIG. 1.

Turning now to FIG. 3, the third process 14 of the set 1 shown in FIG. 1, the dither feature is more fully detailed. In considering this feature 14, it will be remembered that each caliper 100 incorporates an actuating medium-in line and an actuating medium-out line. Logically, the apply valve is positioned within the medium-in line and the release valve is positioned within the medium-out line. Once a steady state is reached by the system, with desired pressure being applied by the caliper, the apply and release valves both close, maintaining the caliper pressure steady state therebetween. If in a steady state, with both valves maintained closed, there would be no means available to reduce any steady state caliper pressure error that may exist.

The dither feature 14 comprises a process that alternately sums a small positive value and a small negative value onto the command pressure value 16, to alternately open and close, respectively, the apply and release valves, each over a brief time interval, so that such steady state error is equalized over time. This can be accomplished by generating a saw tooth wave, or the like at 74, moving back and forth about the steady state value. In this respect, the command pressure can be construed to exist as a step form wave which could, as an example, have a range of 0 to 100 psi, with the saw tooth dither wave 74 having a range of positive to negative 20 psi, as an example, with each complete cycle of the wave being accomplished over an identical period of time which is predefined for the particular system to which it is applicable.

Summing of the oscillating dither values 74 with the command pressure value 16 at predetermined time intervals will produce a fluctuation of pressure value about a steady state point, as shown at 76. To maintain the dither range about the steady state point within proportional limits, it is necessary to be able to turn this feature on and off, as necessary.

In the exemplary embodiment shown, the on/off point might be set at 78 at greater than 100 psi, such that if command pressure is above 100 psi, logic output becomes 1 to turn the feature "on" and if command pressure is below 100 psi, logic output is 0, turning the feature "off", at 80.

The dither feature 14 should be capable of being turned off so that, should the command pressure be 100 psi or less, and the dither feature 14 be set to turn on at 100 psi, with dither range being set at negative to positive 50, for example, the pressure could drop dramatically, which would be detrimental to appropriate system function. Therefore, it is preferable to be able to turn the feature 14 off when dealing with an insubstantial steady state error and only applying the feature 14 against a significant steady state error to equalize same to the steady state value over time.

Thus, the dither process 14 can produce slight fluctuations of pressure about the steady state point, keeping the apply and release valves intermittently actuated, to reduce steady state error in the area of the system therebetween, which area incorporates the caliper 100.

Through empirical testing of an electronically controlled caliper, activation of which is accomplished through use of the method set of the present invention, it has been shown, not only is caliper reaction time decreased, but also actual caliper pressure is found to correlate extremely well with commanded pressure, without the need for caliper pressure sensors of prior systems.

As described above, the present inventive method set provides a number of advantages, some of which have been described and others of which are inherent in the invention. Also, modifications may be proposed without departing from the teachings herein. Accordingly, the scope of the invention is only to be limited as necessitated by the accompanying claims.

What is claimed is:

1. A brake control method for use in an electronically controlled brake-by-wire type vehicular braking system including:
   determining a command caliper pressure;
   determining an estimated caliper pressure;
   comparing the command pressure to the estimated caliper pressure to produce an error value;
   multiplying the error value by a predetermined gain to produce a valve command; and
   controlling apply and release valves responsive to the valve command;
   wherein said method to determine the command caliper pressure comprises:
   determining a command pressure from a brake control module of the system;
   calculating a wheel speed gain value from the sensed wheel speed; and
   proportioning the wheel speed gain value to the command pressure to provide a proportioned wheel speed gain value, the proportioned wheel speed gain value providing the command caliper pressure.

2. A brake control method for use in an electronically controlled brake-by-wire type vehicular braking system including:
   determining a command caliper pressure;
   determining an estimated caliper pressure;
   comparing the command pressure to the estimated caliper pressure to produce an error value;
   multiplying the error value by a predetermined gain to produce a valve command; and
   controlling apply and release valves responsive to the valve command; said method to determine the estimated caliper pressure comprises:
   sensing a supply pressure reading from a high pressure source for the caliper actuating medium;
   eliciting a past cycle estimated pressure value;
   comparing the supply pressure with the estimated past cycle pressure value to obtain a differential pressure reading across the caliper; and
   comparing the differential pressure reading, the past cycle pressure value reading, a past value direction reading and a past valve operation command to corresponding lookup tables for apply pressure vs. valve position and release pressure vs. valve position.

3. The method of claim 2 further comprising:
   saturating the corresponding lookup tables to assure results are within limits of the system;
   initializing an estimation of caliper pressure from the saturated lookup tables when a brake pedal of the system is applied; and
   saturating the estimation within system limits.

4. The method of claim 3 further comprising:
   comparing the command pressure to the saturated estimated pressure and, if an error exists, controlling appropriate opening and closing of the apply and release valves to eliminate the error; and
   cycling back through the steps in closed loop fashion until the comparison of command and estimated pressures provides a substantially negligible error reading, indicating a steady state.

5. A brake control method for use in an electronically controlled brake-by-wire type vehicular big system including:
   determining a command caliper pressure;
   determining an estimated caliper pressure;
   comparing the command pressure to the estimated caliper pressure to produce an error value;
   multiplying the error value by a predetermined gain to produce a valve command; and
   controlling apply and release valves responsive to the valve command;
   said change of command caliper pressure includes a dithering process.

6. The method of claim 5 wherein the dithering process is applicable to the command caliper pressure when the pressure is at a steady state above a predefined lower limit, such that fluctuations of the dither are applied to the command caliper pressure at steady state to keep apply and release valves of the system constantly operational rather than fixed in position, while still maintaining the steady state.

7. A brake control method for use in an electronically controlled brake-by-wire type vehicular braking system including:

determining a command caliper pressure;

determining an estimated caliper pressure;

comparing the command pressure to the estimated caliper pressure to produce an error value;

multiplying the error value by a predetermined gain to produce a valve command; and controlling apply and release valves responsive to the valve command;

wherein a rate of flow through both apply and release valves is determined simultaneously.

8. The method of claim 7 further including the step of summing the rates of flow through both apply and release valves.

9. The method of claim 8 further including the step of converting the summed flow rates to a volume reading.

10. The method of claim 9 further including the step of comparing the predetermined corresponding pressure value to the command pressure value to determine if a difference exists.

11. The method of claim 10 further including the step of determining from an existing difference which of the apply and release valves must be actuated to eliminate the difference.

12. The method of claim 11 further including the step of controlling at least one of the apply and release valves to eliminate the error difference and produce a steady state.

13. The method of claim 12 further including the step of cyclically repeating the above steps during periods of brake pedal application.

14. The method of claim 13 further including the step of causing oscillation of at least one of the apply and release valves by applying a dither feature to the command pressure value, causing the value to oscillate between upper and lower values between which the steady state is centered.

15. The method of claim 14 wherein the step of determining estimated caliper pressure comprises:

comparing line in valve flow to a lookup table of apply pressure values in a memory of a control module of the system;

comparing line out valve flow to a lookup table of release pressure values in a memory of a and control module of the system; and summing the pressure values together to obtain estimated caliper pressure.

16. The method of claim 15 further including the step of applying a saturation point restriction based on system limits to the estimated caliper pressure.

17. The method of claim 16 wherein all variables are placed under a saturation point restriction based on system limitations.

18. The method of claim 17 wherein all variable values are reset to 0 upon brake pedal release.

19. The method of claim 18 wherein command pressure and accumulator pressure actualize upon logic initialization.

20. The method of claim 19 wherein release of the brake pedal is recognized by the logic; ending the process.

21. The method of claim 20 wherein the dither feature turns off below a predefined command pressure value.

22. In an electronically controlled vehicular braking system incorporating a caliper actuation assembly including at least one valve, a method comprising:

generating pressure application command to the caliper actuation assembly by controlling positioning of the at least one valve thereof, estimating the actual pressure applied from a lookup table of predefined levels of applied pressure corresponding to valve position; and generating periodic modulated valve control signals until a near zero difference is determined to exist between the command and estimated applied pressures from the predetermined lookup table data correlating estimated applied pressure and valve position.

23. An electronically controlled brake system comprising:

a controller for controlling pressure applied by a brake caliper through adjustment of at least one valve associated with the caliper, required valve adjustment being determined from a lookup table of estimated pressure applied correlated to valve position, with valve position being adjusted continuously until the estimated pressure applied is substantially identical to pressure required to produce a brake apply of required level as it pertains to brake command pressure;

wherein the method to determine the pressure required comprises determining a command pressure value from a brake control module of the system;

calculating a wheel speed gain value from the sensed wheel speed; and determining a wheel speed;

proportioning the wheel speed gain value to the command pressure value to provide a proportioned wheel speed gain value, the proportioned wheel speed gain value providing the pressure required.

24. A brake control method comprising:

means for determining a command caliper pressure;

means for determining an estimated caliper pressure;

means for comparing the command pressure to the estimated caliper pressure to produce an error value;

means for multiplying the error value by a predetermined gain to produce a valve command;

means for controlling apply and release valves responsive to the valve command;

wherein said means to determine the command caliper pressure comprises:

means for determining a command pressure from a brake control module of the system;

means for determining a wheel speed;

means for calculating a wheel speed gain value from the sensed wheel speed; and means for proportioning the wheel speed gain value to the command pressure to provide a proportioned wheel speed gain value, the proportioned wheel speed gain value providing the command caliper pressure.

* * * * *